(12) United States Patent
Grapov et al.

(10) Patent No.: US 8,773,764 B2
(45) Date of Patent: Jul. 8, 2014

(54) BEAM COMBINER AND DISTRIBUTOR SYSTEM AND METHOD THEREFORE

(75) Inventors: Yuri Grapov, Sutton, MA (US); Michael Digiantommaso, Oxford, MA (US); Gerard Theroux, Oxford, MA (US)

(73) Assignee: IPG Photonics Corporation, Oxford, MA (US)

(*) Notice: Subject to any disclaimer, the term of this patent is extended or adjusted under 35 U.S.C. 154(b) by 267 days.

(21) Appl. No.: 13/221,501

(22) Filed: Aug. 30, 2011

(65) Prior Publication Data

US 2013/0051409 A1 Feb. 28, 2013

(51) Int. Cl.
*G02B 27/14* (2006.01)
*B23K 26/14* (2014.01)
*B23K 26/16* (2006.01)

(52) U.S. Cl.
USPC ..................................... 359/629; 219/121.67

(58) Field of Classification Search
USPC ......... 359/618–640, 227–236, 289–320, 583; 219/121.6, 121.67–121.76
See application file for complete search history.

(56) References Cited

U.S. PATENT DOCUMENTS

| 4,408,602 | A | * | 10/1983 | Nakajima | 606/10 |
| 6,191,382 | B1 | * | 2/2001 | Damikolas | 219/121.62 |
| 2008/0296272 | A1 | * | 12/2008 | Lei et al. | 219/121.69 |
| 2010/0089881 | A1 | * | 4/2010 | Bruland et al. | 219/121.68 |

* cited by examiner

*Primary Examiner* — Stephone B Allen
*Assistant Examiner* — Kimberly N Kakalec
(74) *Attorney, Agent, or Firm* — Y. Kateshov, Esq.; T. King, Esq.

(57) ABSTRACT

The present invention relates to a fiber laser system for processing materials involving a system of interconnected operational components for combining and optionally distributing beams from multiple beam emitters. More particularly, the present invention provides a system for combining and distributing fiber laser beams having different wavelengths and a method for operating the system thereof. Multiple beam combiners may be optionally linked with a beam distribution system. In exemplary use, multiple fiber laser sources generating different wavelength outputs are combined in a single beam incident of a work piece comprising multiple layers.

7 Claims, 7 Drawing Sheets

BEAM COMBINER AND DISTRIBUTOR SYSTEM AND METHOD THEREFORE

BACKGROUND OF THE INVENTION

1. Field of the Invention

The present invention relates to a system for combining and optionally distributing beams relative to multiple beam emitters. More particularly, the present invention provides a system for enabling combining or distributing fiber laser beams having different wavelengths and a method for operating the system therefore.

2. Description of the Related Art

Industrial applications of lasers involve the use of laser heads having single collimators receiving single fibers and supporting respective single laser beams. Most commonly, a single wavelength laser from a laser is employed in a working head for cutting or treating a surface or material.

Laser connector systems are known in the art in an effort to combine respective laser beams through non-fiber connectors upstream from a laser head. The use of conventional connectors prohibits rapid adaptation to different beam selections or wavelength combinations for a rapid-adaptation and flexible process. Typically, the beams are combined via splicing connectors upstream of a laser head. These arrangements are particularly detrimental where combined materials of a diverse nature require cutting or treating with a single beam and there are rapid material changes. For example, where a first material (for example, a film) covers a second material (for example, a sheet material) or a third materials exists, it is often impossible to select a single wavelength best suited for cutting all.

Accordingly, there is a need for an improved system and method for processing of materials using laser beams from a plurality of sources. Further, there is also a need to provide a system for rapidly selecting and combining laser beams for process efficiency.

ASPECTS AND SUMMARY OF THE INVENTION

In response to at least one of these needs, the present invention relates to a system of interconnecting operational components for combining and optionally distributing beams from multiple beam emitters. More particularly, the present invention provides a system for combining and distributing fiber laser beams having different wavelengths and a method for operating the system thereof. One or more beam combiners may be linked with a beam distribution system. One or more dumps are positioned for safety in case of component failure. In exemplary use, multiple fiber laser sources generating different wavelength outputs are combined in a single beam incident of a work piece.

Where specific treatment methods or laser properties such as coherence and short pulse duration, or other manipulation of the lasing source are required, the proposed system and method allows rapid selection, in either sequence or combination, of desired wavelengths to improve process speed and efficiency.

In one alternative aspect of the proposed invention a beam combiner configuration is proposed that allows easy combination of beams through a single collimator, either sequentially or simultaneously.

In another alternative aspect of the proposed invention a beam distributor allows light to propagate along a light path from a beam source (a single or combined beam) through one or more mirrors to a designated output.

It is a further alternative aspect of the present invention that the proposed system allows a process for distributing a combined beam to one or more outputs. For example, the proposed system enables the use of a combined wavelength beam distributed to two or more process heads for simultaneously processing.

The above and other aspects, features and advantages of the present invention will become apparent from the following description read in conjunction with the accompanying drawings, in which like reference numerals designate the same elements.

BRIEF DESCRIPTION OF THE DRAWINGS

FIG. 1 is a schematic view of the workpiece to be processed.

DETAILED DESCRIPTION OF THE PREFERRED EMBODIMENTS

Figure 1:
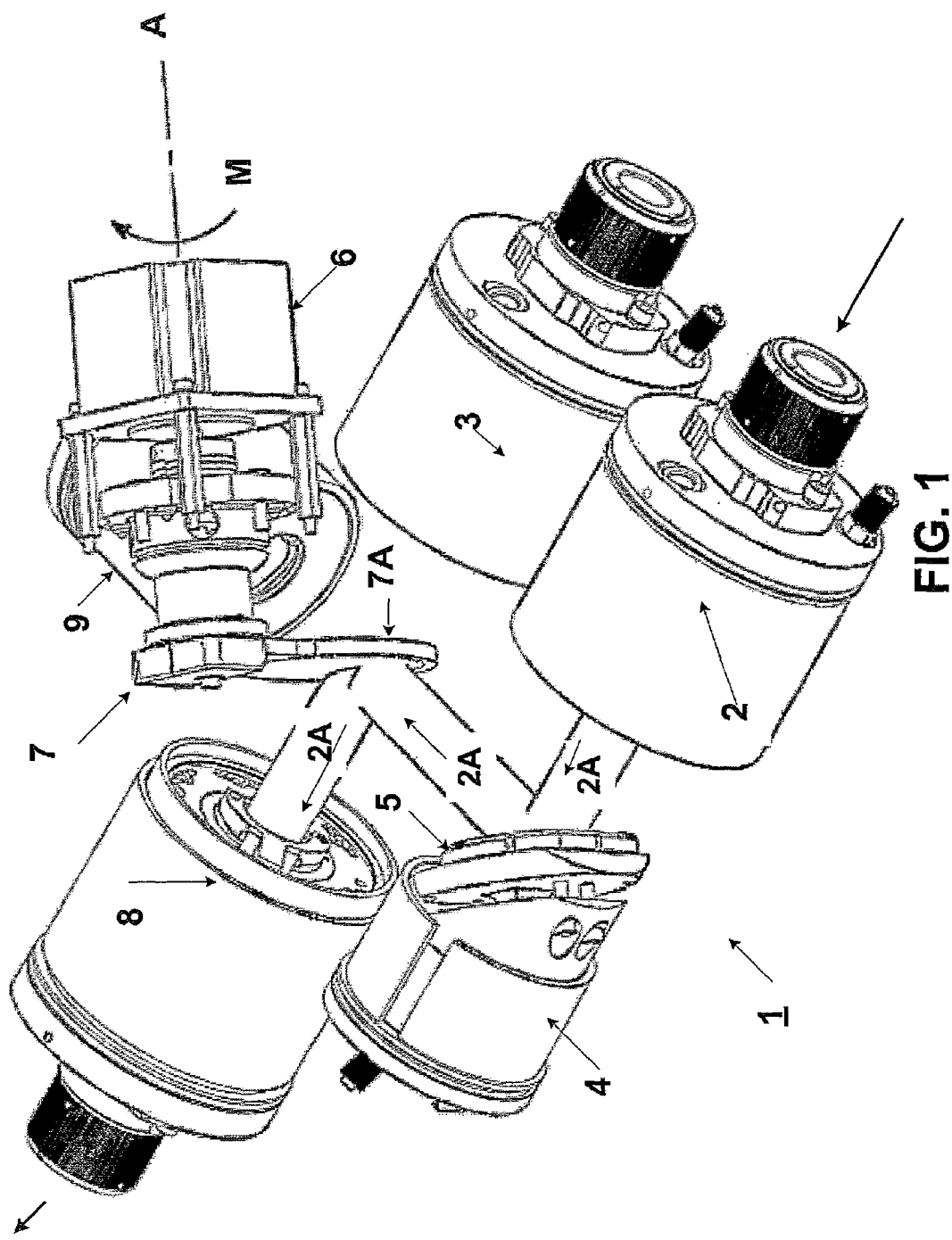
FIG. 1 is a perspective view of a beam combiner system showing a sequential combination from two beam emitters.

Reference will now be made in detail to embodiments of the invention. Wherever possible, same or similar reference numerals are used in the drawings and the descriptions refers to the same or like parts or steps. The drawings are in simplified or schematic form and are not to scale. For convenience and clarity only, directional (up stream/down stream, etc.) or motional (forward/back, etc.) terms are used with respect to the drawings. These and similar directional terms should not be construed to limit the scope of the invention in any manner.

Figure 1A:
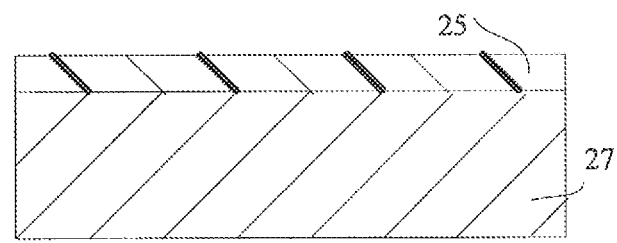
Figure 2:
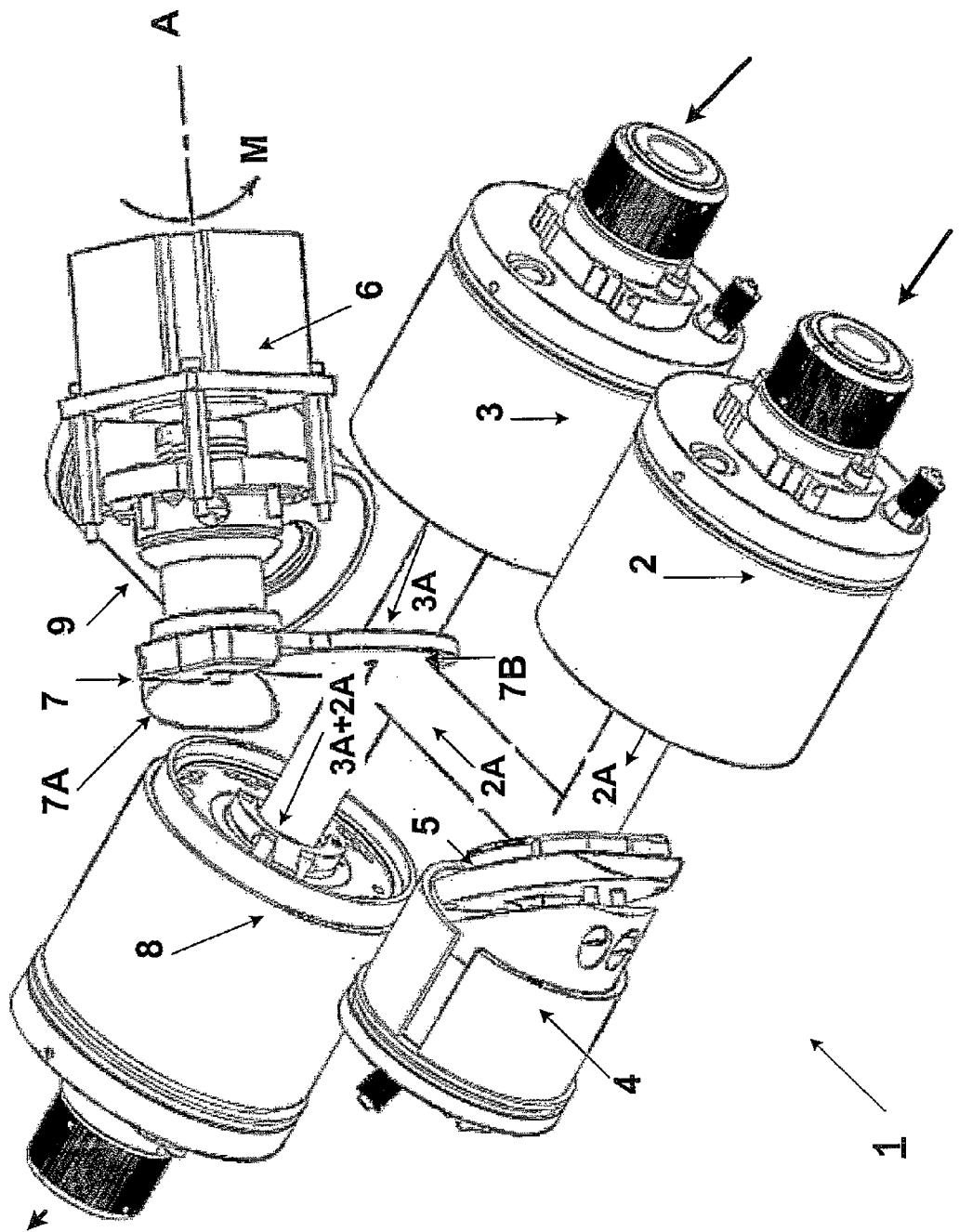
FIG. 2 is a perspective view of the beam combiner in FIG. 1 showing a simultaneous combination from two beam emitters.

Referring now to FIGS. 1, 1A and 2, an exemplary beam combiner system 1 operably contains a first emitter and 2 and a second emitter 3 as sources secured in a relative arrangement. Emitters 2, 3 generate outputs at different wavelengths.

A mirror assembly 4 contains a mirror member 5, as shown, and an assembly of adjustment elements effective for operation and alignment in beam combiner system 1. A mirror rotating mechanism 6, serving as a beam selector, having a pivot axis A is operative to pivot a rotating mirror assembly 7 relative to respective beam paths. One or more mirrors 7A, 7B are in rotating mirror assembly 7 (See FIG. 2). For convenience, mirror 7A (FIGS. 1 and 2) is a 100% mirror, while mirror 7B is a 50%/%50% mirror (FIGS. 2 and 3), although any other minor or window may be adaptively included without departing from the invention.

As a result, via rotational motion M controlled by an external computerized process control unit (not shown) providing digital controlling input to mirror rotating mechanism 6, combining system 1 rotates mirrors 7A, 7B as needed to either sequentially select a beam or simultaneously combine a beam. As noted in FIGS. 1 and 2 an optical dump 9 is provided for safety if there is a malfunction in mirror rotating mechanism 6, rotating mirror assembly 7, or respective mirrors 7A, 7B. It is noted, that dump 9 may be located outside the laser head, and indeed may be joined to the laser head only by an operative optical relay (not shown) to allow far distant positioning.

In FIG. 1, beam emitter 2 emits a beam 2A reflecting from mirror member 5 to 100% mirror 7A and fully directed outwardly through an output collimator 8 having an operable adjustment mechanism (shown but not discussed for centering and focus and the like). In FIG. 1, beam combiner system 1 is operating selectively between beam emitters 2, 3 in a sequential process (one emitter then the other). In the exemplary process, the above-noted sheet material having a film would be cut in two passes, a first pass to cut the film 25 (FIG. 1A) using one emitter having a wavelength suitable for the film, and a second pass cutting the sheet material 27 (FIG. 1A) using the second emitter having a wavelength suitable for the sheet material.

In FIG. 2, a simultaneous process is presented wherein both emitter 2 and emitter 3 emit beams, respectively beams 2A and 3A emit. Here, mirror rotating mechanism 6 has rotated to position mirror assembly 7 and thus position mirror 7B (a 50%/50% mirror) along the path of beams 2A and 3A. Again, an operative optical dump 9 is effectively positioned for safety in the process. Thus, during the process emitters 2 and 3 emit simultaneously through collimator 8. In this exemplary process, the above-noted sheet material having a film would be cut in one passes, the single pass combing the wavelengths to cut both the film and the sheet material simultaneously.

It will be recognized that beam emitters 2 and 3 may be collimators receiving beams from fiber lasers linked with one or more upstream laser diodes. As a result, those of skill in the art will recognize that beam emitters 2 and 3, as collimators, may also contain focusing and adjustment features, etc. not discussed herein. Similarly, emitters 2 and 3 and collimator 8 may all employ temperature regulation systems for optimal performance.

Figure 3:
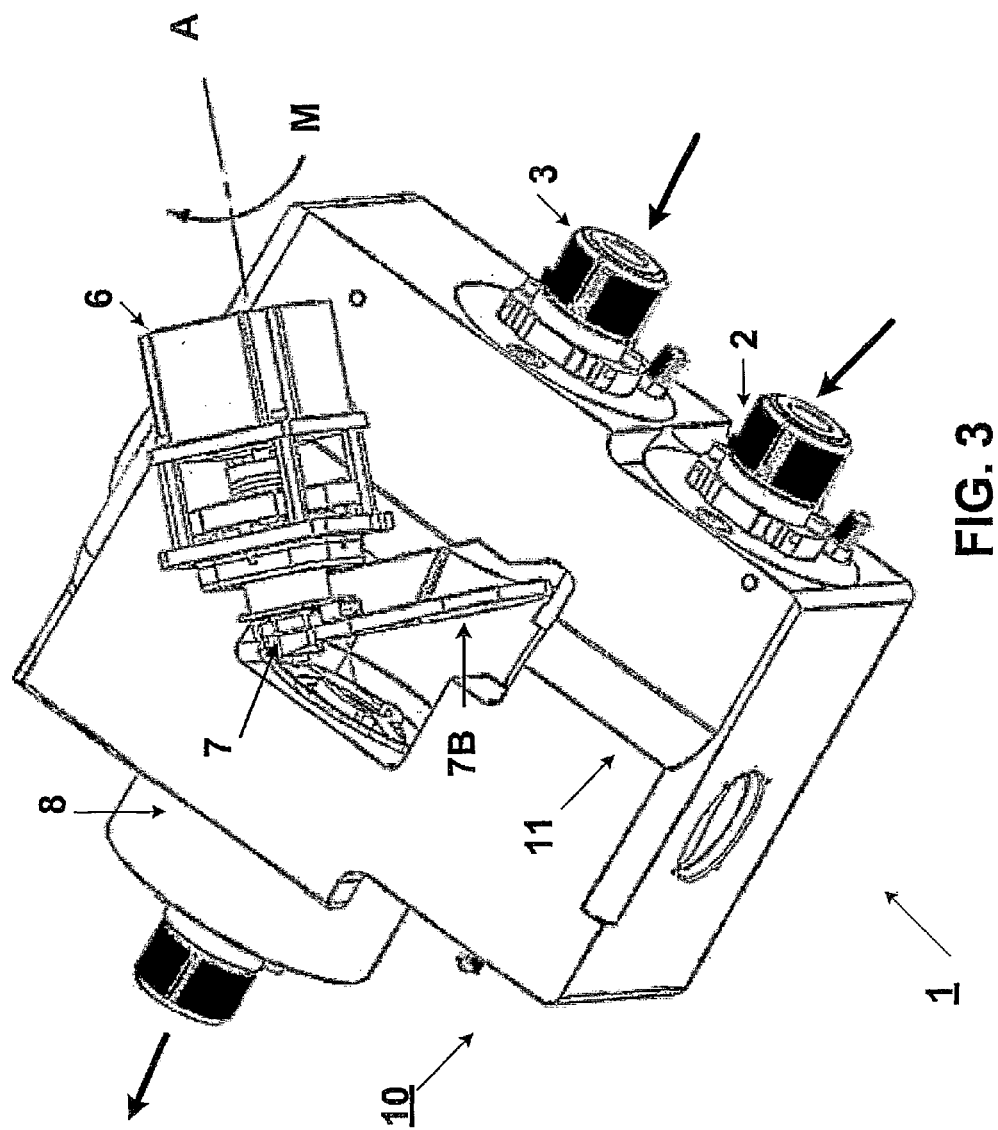
FIG. 3 is an exemplary perspective view of the beam combiner in FIGS. 1 and 2 in a process housing.

Referring now to FIG. 3, an exemplary laser head unit 10 is provided having a housing 11 supporting input from respective emitters 2 and 3. It will be noted that mirror rotating mechanism 6 is exposed, but would practically be protected by a cover (removed for the detail). Similarly, it will be possible and desirable for dump 9 to be within laser head unit 10, but alternatively it will be recognized as possible to locate dump 9 remotely, depending upon system arrangements.

In considering beam combining system 1 in FIGS. 1-3 (working to sequentially or simultaneously combine beams), those of skill in the art will recognize that the system may work in a reverse direction, where a beam entering collimator 8 may be directed, or split, to either beam emitter 2, 3, (now working in reverse to receive the so-directed beam) either sequentially or simultaneously. In considering the next embodiments, this dual direction capability will be recognized.

Figure 4:
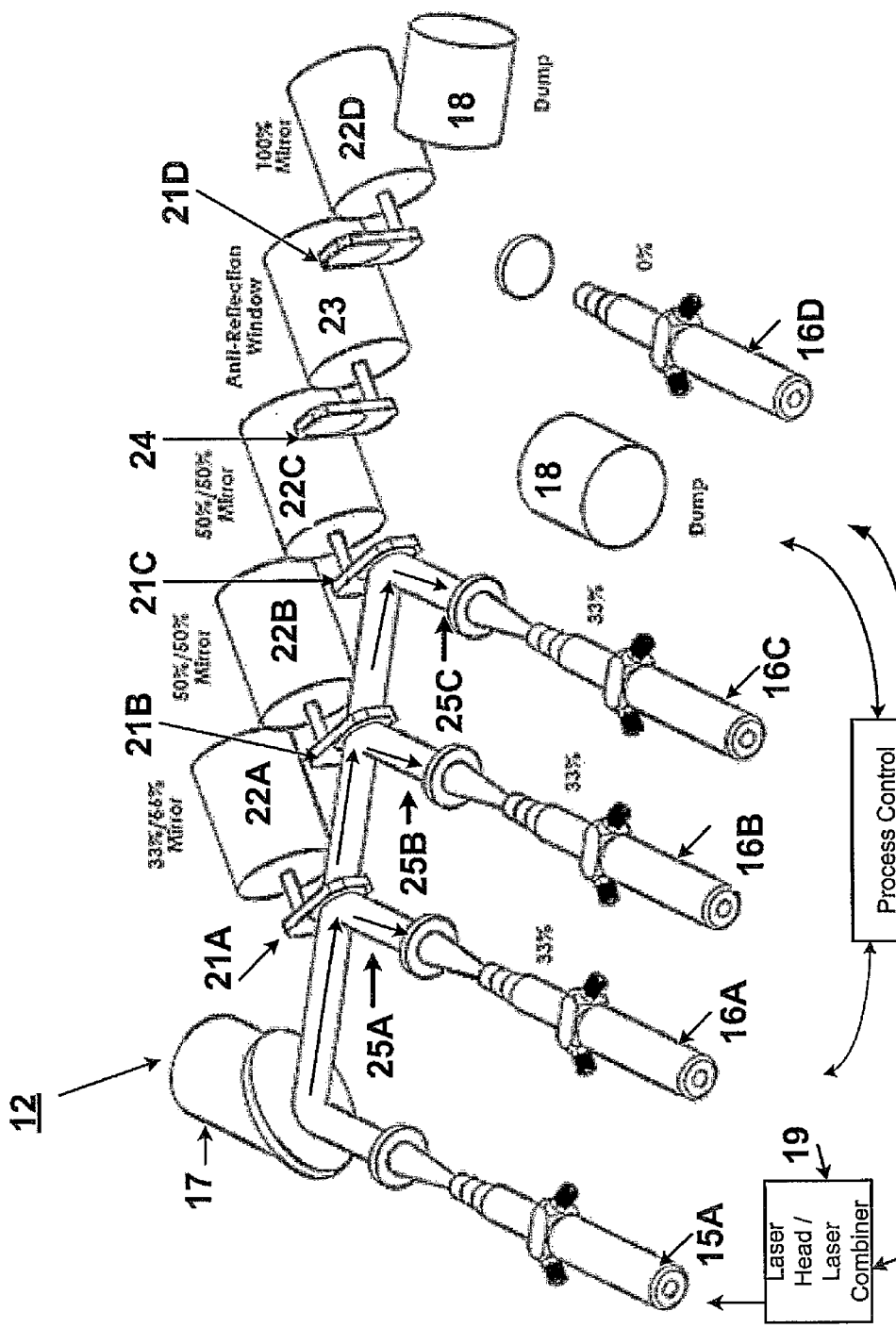
FIG. 4 is an exemplary process schematic of a beam distribution system, wherein an input beam is distributed into three equal beams, or conversely three different beams from collimators are combined into a single beam and a computer process control unit is integrated for system management and control.

Referring now to FIG. 4, a, operable beam distributor system 12 is illustrated. A collimator 15A receives an initial beam from a laser head or laser combiner unit 19 (shown) which reflects from a mirror 17 along a beam path to a first partially reflective mirror 21A driven by a process controlled motor 22A. A partial split or reflection, according to the type of mirror 21A, distributes a portion of beam at 25A (noted as 33%) to a collimator 16A for downstream processing.

Thereafter the beam continues to a second partially reflective mirror 21B driven by a process controlled motor 22B splitting or distributing a portion of the beam at 25B (noted as 50%) to a collimator 16B for downstream processing.

Further, the remaining beam continues to reflective mirror 21C driven by a process controlled motor 22C directing remainder portion of the beam at 25C (noted as 50%) to a collimator 16C for downstream processing.

As additional features in system 12, dumps 18 are provided relative to the beam path and an alternative (and unused collimator 16D, mirror 21D and motor 22D are provided). Further, an anti-reflection window 24 driven by a process controlled motor 23 linked with a further dump 18 is provided before end collimator 16D. Therefore, as with FIG. 5 (discussed next), a full beam from collimator 15A may be transferred (distributed) to collimator 16D and conversely also within the scope of the current invention.

Further, it will be recognized that (operating in the opposite direction) multiple beams from collimators 16A, 16B, 16C, or 16D could optionally be combined to mirror 17 to collimator 15A in a process converse to that noted above. Here, as in FIGS. 1-3, the dump feature is very important as a safety factor for process control.

Finally, it will be recognized that a process control unit 20, containing suitable computer control features, memory, and a central processing unit (CPU) etc. is operatively connected (represented by multiple double arrows) with each component to enable monitoring, control, and operation of each of the elements.

Figure 5:
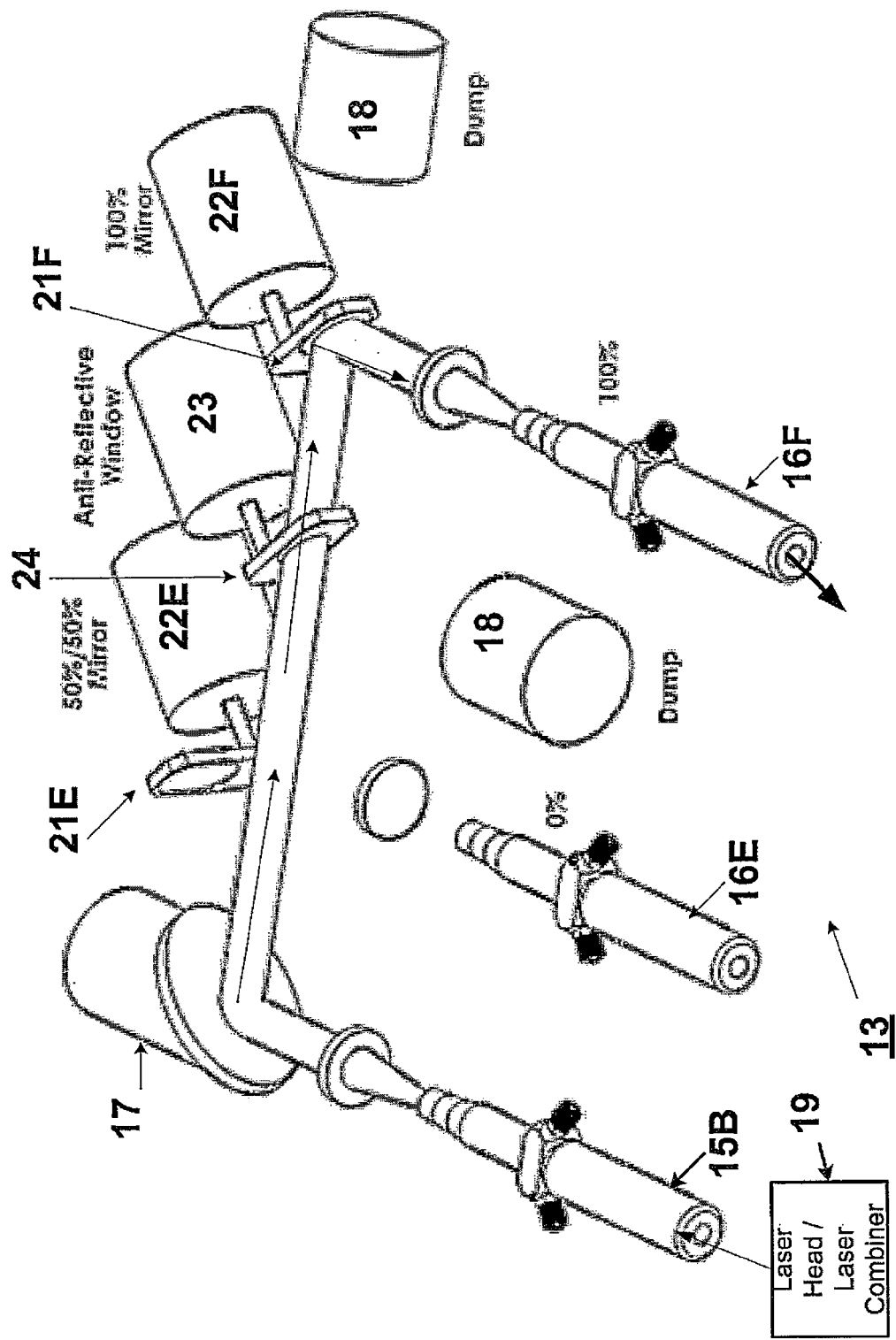
FIG. 5 is an exemplary process schematic of a beam distribution system, wherein a single input beam is distributed to one output and then to a laser head by a fiber.

Referring now to FIG. 5, an optional beam distributor system 13 is provided having a collimator 15B receiving a beam from mirror 17 transmitted through an antireflective guard 24, pivotally controlled by an anti-reflective motor 23. The beam processes through guard 24 from 100% mirror 21F operated by motor 22F and originates from collimator 16F. For safety, dump 18 is located opposite guard 24, and a further dump 18 is located proximate the final 100% mirror.

FIG. 5 is in simplified form, but it will be recognized that a stand by collimator 16E is prepared with a standby window mirror 21E driven by a motor 22E, is operative should process control 20 (noted earlier but not shown) require a combination with the beam from collimator 16F. The output via a fiber from 15B is directed to laser head or laser combiner 19 for further downstream use. Of course, it will be recognized that in distribution system 13 the beam may be permitted to travel conversely without departing from the present invention.

Figure 6:
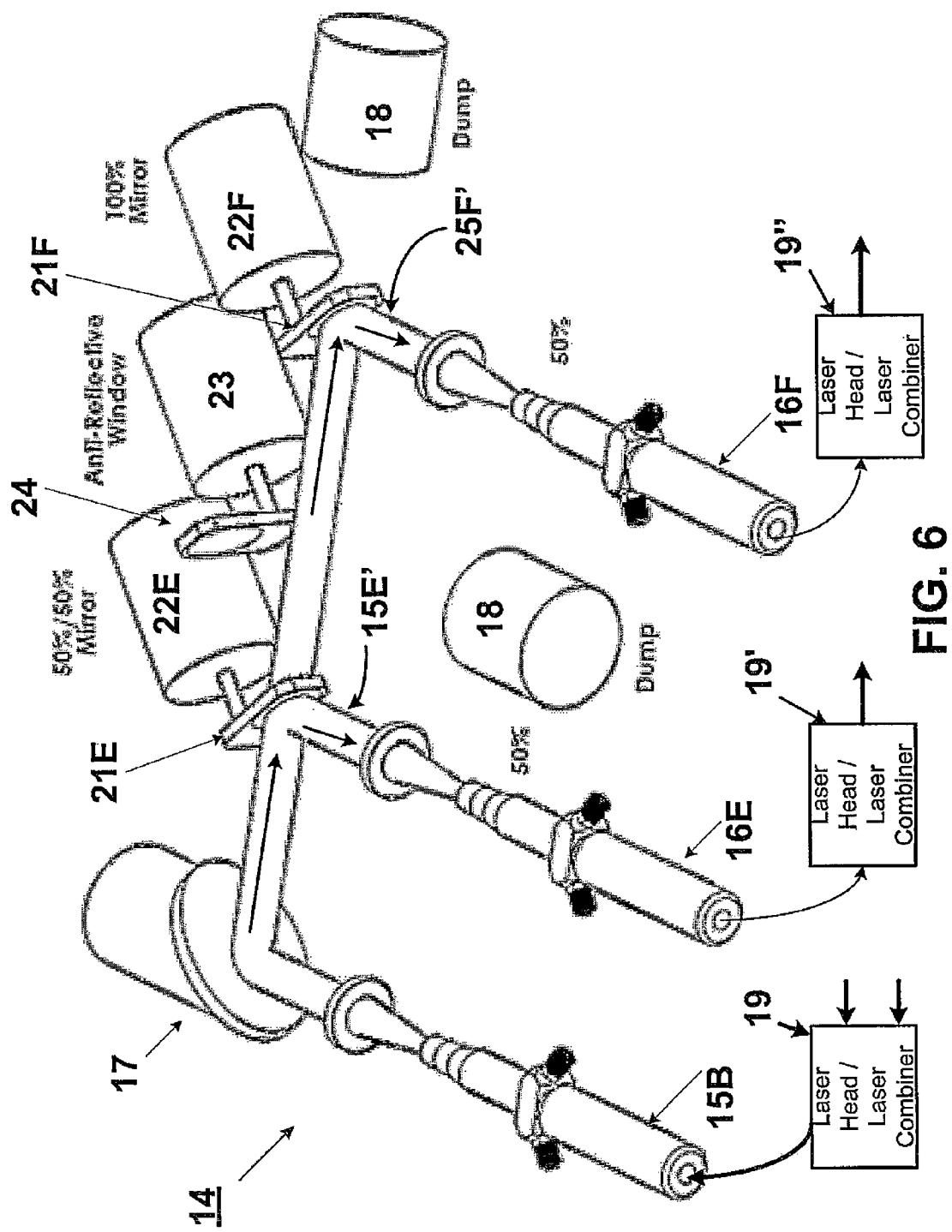
FIG. 6 is an exemplary process schematic of an integrated beam distribution and combiner system, wherein two inputs are combined to a single input and then distributed to two outputs.

Referring now to FIG. 6, a further alternative beam distributor system 14 is provided with beam emitter 15B shown as a collimator directing a combined beam from laser head or laser combiner 19 (shown as two arrows) to mirror 17 along a path to partial mirror (50%/50%) 21E driven by motor 22E pivoted into the beam path to create a partial beam 25E' to collimator 16E (noted earlier) while allowing the remaining 50% to pass to reflective mirror 21F (100% mirror) and thus to a partial beam 25F' to collimator 16F. Here, beams 25E' and 25F' are further passed by fibers to other laser heads or laser combiners 19', 19" for further downstream use. Here, the initial beam is distributed, or split, but conversely may allow for combination of two beams into a single beam in reverse operation.

As a result of considering FIGS. 5 and 6 it will be understood that beam distributor systems 13 and 14 are substantially related, differing on the additional use of a split mirror 21E and the direction of beam path.

Process control unit 20 and optionally individual process controllers (not shown but introduced in FIG. 4) are operably linked with components of the proposed systems, and include computerized process units (CPUs), an operational process control programs, memory or data storage systems (all not shown).

It will be understood by those of skill in the art that any of the rotating mirror assemblies noted in any of the FIGS. 1-6, may contain multiple mirrors (as in FIG. 2), allowing for a single pivot motor to operate in a no-mirror position, anti reflection position, partial mirror (for example 33% or 50%, or other), or a full 100% mirror. There is no limitation (other than space) on the number of mirrors used.

It will be understood that the phrases split and/or distributed and/or combined when used in the scope of the present invention are illustrative of the exemplary beam systems discussed, and may be used without restriction. Such that a beam may be combined and then distributed before it is split, or the phrase split and distributed may mean the same concept, or a beam that is split may be combined and/or distributed further downstream in this fiber laser arrangement without confusion. The concepts and embodiments herein are exemplary and those of skill in the related art have a technical expertise such that the meaning will be easily understood.

It will be further understood from those of skill in the technical arts that the proposed systems may be jointly combined and interchanged to provide an overall beam management system that operates according to the proposed invention. For example, any of the beam emitters in FIGS. 1-6 may be beam combiners, such that the output beam is then distributed or split at need.

It will be further understood that one or more computer process units/control units (CPU's) provides integrated system management and control with respective components. For example, while not shown in all Figures, each proposed embodiment will be understood as integrated with one or more CPUs.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. Finally, it will be noted that the phrase 'fiber' is not limiting. Indeed 'fiber laser sources' may be non-fiber laser sources without departing from the scope and spirit of the present invention. For example, a fiber-laser source may be paired with a non-fiber laser source with suitable configurations—this will all be understood to be within the scope of the present invention.

What is claimed is:

1. A fiber laser system for processing materials, comprising:
    a plurality of fiber laser sources generating respective outputs at different wavelengths;
    a beam combiner configured with:
        a housing,
        a plurality of spaced first emitters mounted to the housing and extending along respective first parallel axes, the first emitters being configured to receive respective outputs from the fiber laser sources and output respective first beams at respective different wavelengths,
        a second emitter mounted to the housing coaxially with one of the first emitters and spaced from the first emitters, the second emitter receiving selected first beams so as to emit a single output beam for incidence upon an external workpiece to be processed, and
        a selecting system within the housing configured with:
            a first fully reflective mirror configured to redirect the first beam from at least one another of the first collimators transversely to the first parallel axes,
            a mirror mount rotatably mounted in the housing, and
            a plurality of second spaced mirrors mounted to and rotatable with the mirror mount, the mirror mount selectively displacing each of the second mirrors into a working position in which a selected second mirror intersects the first axis of the one second emitter downstream therefrom, wherein one of the second mirrors is configured for a sequential combination of the first outputs into the single output beam and another second mirror is configured for a simultaneous combination of the first outputs into the single output.

2. The fiber laser system of claim 1, wherein:
    the selecting system is configured for the simultaneous combination of the one second mirror of ones into the single output beam such that light at one of the wavelengths cuts a first portion of the workpiece and a second light of a second wavelength simultaneously cuts a second portion of the workpiece covered by the first portion to allow a simultaneous processing of the workpiece.

3. The fiber laser system of claim 1, wherein:
    the one second mirror of the selecting system is configured for the sequential combination of the ones into the single output beam such that light at one of the wavelengths is cuts a first portion of the workpiece and sequentially a second light of a second wavelength cuts the second portion of the workpiece covered by the first portion to allow a sequenced cutting of the workpiece.

4. The fiber laser system of claim 1, wherein the output emitter includes:
    an output collimator outputting the single output beam.

5. The fiber laser system of claim 1, wherein:
    the second mirrors each are selected from the group consisting of a fully reflective mirror and antireflective mirror.

6. The fiber laser system of claim 5 further comprising:
    at least one optical dump configured to safely receive ones of the respective outputs upon a failure of the second mirror; and
    a receiving portion of the dump configured perpendicular to the axis of the output collimator.

7. The fiber laser system of to claim 1, further comprising:
    a computerized control system configured to operatively control the plurality of fiber laser sources; the beam combiner, and the selecting system, whereby the computerized control system is effective to configure the one of the sequential combination and the simultaneous combination into the single output.

* * * * *